No. 706,281. Patented Aug. 5, 1902.
W. A. THIERMANN.
MEANS FOR TRANSMITTING MOVEMENTS AND INDICATING POSITIONS ELECTRICALLY.
(Application filed Apr. 4, 1902.)
(No Model.) 2 Sheets—Sheet 2.
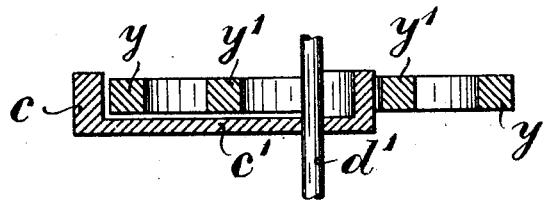

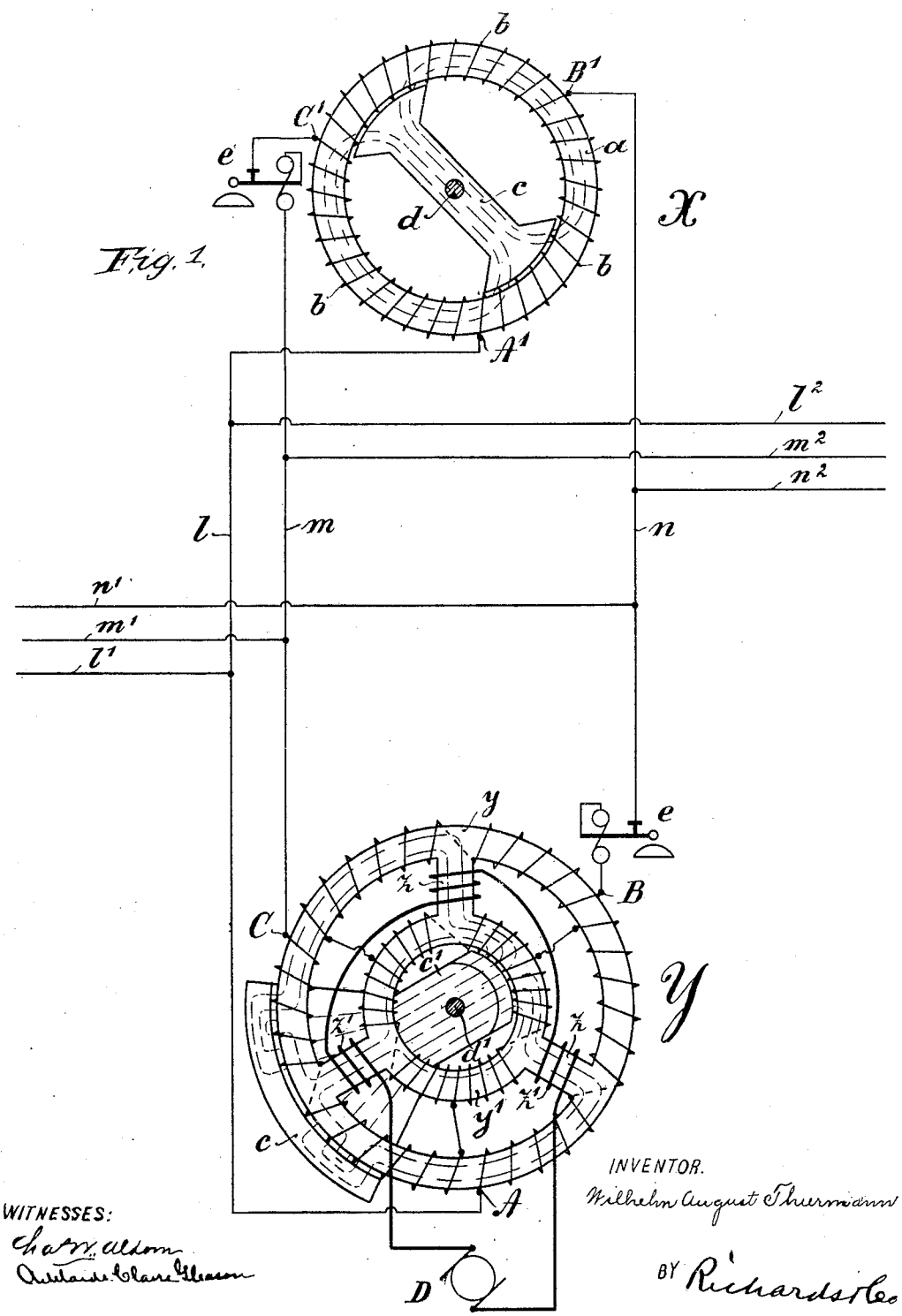

UNITED STATES PATENT OFFICE.

WILHELM AUGUST THIERMANN, OF HANOVER, GERMANY.

MEANS FOR TRANSMITTING MOVEMENTS AND INDICATING POSITIONS ELECTRICALLY.

SPECIFICATION forming part of Letters Patent No. 706,281, dated August 5, 1902.

Original application filed November 12, 1901, Serial No. 82,029. Divided and this application filed April 4, 1902. Serial No. 101,383. (No model.)

*To all whom it may concern:*

Be it known that I, WILHELM AUGUST THIERMANN, professor at the Technische Hochschule in Hanover, a subject of the King of Prussia, Emperor of Germany, residing at 19 Oeltzenstrasse, Hanover, Germany, have invented certain new and useful Improvements in Means for Transmitting Movements and Indicating Positions Electrically, of which the following is a specification.

The present invention relates to a system of transmitting movements and indicating positions by means of pulsating direct current, single or polyphase alternating current. In this system two or more apparatuses may be employed. Every apparatus consists of a movable member (the rotor) and of a stationary member, (the stator.) The rotors are bipolar and have no winding. The stator of each apparatus has a winding which is divided in sections. These sections of all stators are respectively connected in parallel. One of the stators must have a second winding which is to be connected to a suitable source of electricity. This winding acts as primary coil of a transformer, and the other winding of this stator acts as secondary coil of which the sections of windings of all other stators are branched off in parallel—*i. e.*, in such a way that the sections of each winding are connected to the respective sections of all other stators. The stator, which is supplied with the primary and the secondary coils, is preferably any of those kinds described in my specification, Serial No. 82,029, filed November 12, 1901, from which this specification has been derived by way of division.

If the rotor of any apparatus is moved or shifted—for instance, by hand—compensating currents will arise and cause the corresponding movement of all other rotors. Therefore every apparatus may be employed as transmitter or as receiver.

The accompanying drawings illustrate in Figure 1 the combination of one apparatus whose stator has a primary and a secondary winding with an apparatus whose stator has only one winding connected in parallel to the secondary winding of the first apparatus. Fig. 2 is a detail sectional view.

It is to be well understood, that more apparatuses with only one winding may be employed according to the desired number of stations, which shall receive the same movements of the rotors. For instance, the drawings show connecting-lines $l'\ m'\ n'$ for a second and connecting-lines $l^2\ m^2\ n^2$ for a third apparatus. In the same manner may be arranged further lines—say $l^3\ m^3\ n^3$—viz., $l^4\ m^4\ n^4$—and so on, according to the desired number of apparatuses. It is further to be well understood that instead of the apparatuses shown in the drawings any other suitable form my be made use of—for instance, such of the kinds described in my application Serial No. 82,029.

In the drawings the stator of the apparatus X consists of an iron ring $a$, made, preferably, of single-ring laminæ. On the ring $a$ is placed the encircling winding $b$, which is divided in three sections by the points $A'$ $B'$ $C'$. The rotor $c$, preferably also made of iron laminæ, has no windings and is bipolar. It is supported by the axle $d$, running in suitable bearings. (Not shown in the drawings.)

The apparatus Y consists of two concentric rings $y$ and $y'$, which are connected with each other by means of three radial spokes $z$. On the rings are placed the encircling secondary windings $b'$, three points of which, A B C, are connected with three corresponding points $A'\ B'\ C'$ of the winding $a$ of apparatus X by the lines $l\ m\ n$. On the spokes $z$ are wound coils $z'$, which are connected to a source of electricity D. The stator $c'$, fixed to the axle $d'$, is bipolar and has no windings. One pole of the stator $c'$ works with the inner side of the inner ring and the other with the outer side of the outer ring. Stator and rotor are also preferably made by iron laminæ. Preferably a bell $e$ is inserted in one of the connecting-lines—say line $m$ at the apparatus X and line $n$ at the apparatus Y.

Let us assume for the purpose of explaining the method of operation that the apparatus X is the transmitter and the apparatus Y the receiver and that the rotor $d'$ of the transmitter has just been moved or shifted by an impulse which is to effect during the next instant the same position of the rotor $d$ in the receiver Y. The lines of force generated by each primary winding are indicated on the drawings by two broken lines, their momentary direction being marked by the arrows. They take a path which varies according to the position of the rotor and is dependent thereon and are in a manner fixed only in their central portions by the primary windings. The manner in which their ends unite is, however, dependent on the position at that time of the corresponding rotor. From the path of the lines of force in the lower figure it results that the difference of potential at the end of the coil A B in the assumed position of the rotor is approximately equal to that at the terminals of the coil B C, but that these differences of potential are of opposite sign. The difference of potential between the ends of the coil C A is, on the other hand, considerably smaller, even almost zero, as the windings of this coil are cut by approximately half the lines of force in one direction and by the other half of the lines of force in the opposite direction. Consequently the points A B C are at different potentials. Other differences of potential exist between the points A' B' C' in the receiver than those between the corresponding points A B C of the transmitter which are connected with them. Compensating currents will consequently have to flow between the points A and A', B and B', C and C' until the points connected with each other have the same potential. This takes place when the lines of force of the magnetic field of the receiver have moved into exactly the same position as those of the transmitter. The field of magnetic force can move in this manner, however, only if the rotor also moves. The rotor does actually move as it naturally adjusts itself, so that the magnetic reluctance is a minimum. In the position of rest it consequently always connects the places where the lines of force are most dense in the outer and inner rings. If the rotors are now rotated successively into any desired number of positions, it will be found that the total number of lines of force passing through the secondary winding always remains unaltered, but that notwithstanding even a slight movement of the rotor correspondingly different potentials arise at the points A, B, and C.

The bells e are so regulated that they only ring if rather strong currents pass them. Since such currents only flow in the lines at the moment when the transmitter is displaced, the bell will give notice of every alteration in the position of the indicator.

Instead of branching off other apparatus with only one winding there may also be employed apparatuses with primary and with secondary windings, as Y, or such apparatuses as described in my application, Serial No. 82,029, filed November 12, 1901.

In the new system, transmitter and receiver can constantly exchange functions; they may be excited with primary current or not, and the movement of one apparatus, is in all cases transmitted synchronously to the others. Moreover, as already stated above, it is of no consequence whether the primary coils are supplied with pulsating direct current, single or polyphase alternating current. The indicators of the apparatuses can be fixed direct on the rotors, so that any further mechanical gearing (pawls, gear-wheels, and the like) is obviated. Finally, there may be mentioned as special advantages of this system that current-conducting movable members are nowhere present and that the number of adjustment or stopping places is unlimited and independent of the number of connecting-wires.

Having now described my invention, what I claim as new, and desire to secure by Letters Patent, is—

1. In a system for the transmission of movements and positions of indicators by means of electric currents, the combination of one apparatus, consisting of a bipolar rotor without windings and a stator having a primary winding, which is connected to a source of electricity, and also a secondary winding, with one or more apparatuses, consisting of a bipolar rotor without windings and a stator having only one winding, whose sections are respectively connected to the sections of said secondary winding at the corresponding points, substantially as shown and described.

2. In a system for the transmission of movements and positions of indicators by means of electric currents, the combination of one apparatus, consisting of a bipolar rotor without windings and a stator having a primary winding, which is connected to a source of electricity, and also a secondary winding, with one or more apparatuses, consisting of a bipolar rotor without windings and a stator having only one winding, whose sections are respectively connected to the sections of said secondary winding at the corresponding points, by lines, one of which near to each apparatus is provided with a bell, which sounds only when compensating currents occur and which stops ringing, when the rotor is adjusted, substantially as shown and described.

In witness whereof I have hereunto set my hand in presence of two witnesses.

WILHELM AUGUST THIERMANN.

Witnesses:
 PAUL RICHARD FRÜCHTNICHT,
 LEONORE RASCH.